United States Patent Office 3,833,613
Patented Sept. 3, 1974

3,833,613
PRODUCTION OF ESTERS
Peter Graham Spencer Field, London, England, assignor to Burmah Oil Trading Limited, London, England
No Drawing. Filed Nov. 2, 1972, Ser. No. 303,074
Claims priority, application Great Britain, Nov. 5, 1971, 51,563/71
Int. Cl. C07d 7/06, 9/00
U.S. Cl. 260—343                                    7 Claims

ABSTRACT OF THE DISCLOSURE

A process for the production of cyclic esters comprises reacting a cyclic ketone and a hydroperoxide in the presence of a catalytic amount of metaboric acid, the anhydride thereof or an ester thereof in an inert diluent under substantially anhydrous conditions.

The cyclic esters are useful as intermediates in the production of corresponding lactams which are employed in the production of nylon.

---

This invention relates to a process for the production of cyclic esters.

Cyclic esters (lactones) are valuable intermediate products from which can be prepared the corresponding lactams, the latter being useful in the production of nylon. The cyclic esters have in the past been prepared by oxidation of ketones but the processes which have been hitherto employed have suffered certain disadvantages. We have now discovered that the cyclic esters can be more advantageously prepared by a catalytic oxidation process not hitherto employed.

According to the present invention there is provided a process for the production of cyclic esters which process comprises reacting a cyclic ketone and a hydroperoxide in the presence of a catalytic amount of metaboric acid, the anhydride thereof or an ester thereof in an inert diluent under substantially anhydrous conditions.

The cyclic ketones used in the process of the present invention are preferably those containing from 5 to 12 carbon atoms, examples of which are cyclopentanone, cyclohexanone and cyclododecanone. More preferably the ketones contain from 5 to 7 carbon atoms.

The hydroperoxide used in the process of the invention may have the formula

R—OOH wherein R is an alkyl, alkenyl, aryl, alkaryl or aralkyl group any of which groups may optionally contain other substituents. It will be appreciated however that in no case should the carbon atom attached to the —OOH group be part of an acyl radical.

Preferably, R represents an alkyl or alkaryl group, suitable hydroperoxides being cumene hydroperoxide, cyclohexyl hydroperoxide, ethyl benzene hydroperoxide and tertiary butyl hydroperoxide. The latter two hydroperoxides are particularly preferred reactants in the present invention.

The catalysts used in the present invention may be metaboric acid (H—O—B=O) or its anhydride ($B_2O_3$). Metaboric acid can be prepared by the azeotropic distillation of orthoboric acid and in the preferred embodiment of the present invention the catalyst is metaboric acid formed *in situ* by this method. Alternatively a metaborate ester having the formula $(R^1—O—B=O)_n$ may be used, wherein $R^1$ is an alkyl, aryl, alkaryl or aralkyl group, for example an alkyl group containing from 1 to 12 carbon atoms, any of which groups may optionally be substituted and $n$ is an integer which is 1 or 3 depending on the stereochemistry of the alkyl, aryl, alkaryl or aralkyl group. In accordance with the invention the metaboric acid, or anhydride or ester thereof is employed in a catalytic amount and this may be, for example, from 0.1 to 20 mole percent, preferably about 10 mole percent, of the amount of the ketone employed.

The diluent used in the present invention is inert, i.e. not substantially affected by the reactants under the conditions of the reaction, and may be, for example, cyclohexane, ethyl benzene or toluene. These diluents are slightly affected by the hydroperoxide reactant, although not sufficiently to be seriously detrimental to the process. However, it is preferred that the diluent is an oxidatively stable hydrocarbon such as benzene.

The reaction may be carried out at the highest temperature consistent with safety and a reasonable reaction time. This temperature usually lies between 120° and 200° C. depending on the reactants although temperatures as low as 100° C. can be used. The optimum temperature for the production of esters is generally between 165° and 175° C. However in order to achieve a more commercially viable balance between esters and other valuable substances produced as by-products, temperatures between 120° and 140° C. may be more desirable. It is preferred to maintain the reactants and the diluent under sufficient pressure to maintain them all in the liquid phase and it is also preferred, when working under pressures higher than atmospheric, to work with a low concentration of hydroperoxide, for example about 10% by weight.

In order to reduce side reactions, compounds and metals capable of inducing the free radical decomposition of the hydroperoxide should be kept to a minimum. Inefficient stirring when using a solid catalyst may also increase unwanted by-products at the cost of the required ester.

It is to be understood that the present invention also includes cyclic esters whenever prepared by the process of the invention.

There now follows by way of example a description of several reactions carried out in accordance with the present invention (Examples 1 to 9) and a comparative example (Example 10) to illustrate the necessity for using a catalyst.

EXAMPLE 1

0.2 g. boric anhydride, 2.0 g. tertiary butyl hydroperoxide and 2.0 g. cyclohexanone were diluted with 18.0 g. of cyclohexane and added to a pressure tube. The reaction was carried out by heating at 170° C. for 4.5 hours with agitation. A 70% conversion of ketone was obtained at 90% selectivity to ε-caprolactone.

EXAMPLE 2

0.08 g. of boric anhydride, 1.0 g. tertiary butyl hydroperoxide and 1.0 g. cyclohexanone were diluted with 9.0 g. benzene and added to a pressure vessel. The reaction was carried out by heating at 170° C. for 4.5 hours with agitation. A 65% conversion of ketone was obtained at 95% selectivity to ε-caprolactone.

EXAMPLE 3

0.08 g. boric anhydride, 1.0 g. tertiary butyl hydroperoxide and 1.0 g. cyclohexanone were diluted with 9.0 g. of benzene and added to a pressure vessel. The reaction was carried out by heating for 4.5 hours at 140° C. with agitation. A 40% conversion of ketone was obtained at a selectivity of 87% to ε-caprolactone.

EXAMPLE 4

5.0 g. tricyclohexyl oxyboroxine, 1.2 g. tertiary butyl hydroperoxide and 1.0 g. cyclopentanone were diluted with 9.0 g. tertiary butyl alcohol and added to a pressure tube. The reaction was carried out by heating for 17 hours at 120° C. with agitation. A 55% conversion of ketone was obtained at a selectivity to δ-valerolactone of 81%.

EXAMPLE 5

1.6 g. tricyclohexyl oxyboroxine, 0.5 g. tertiary butyl hydroperoxide and 0.5 g. cyclopentanone were diluted with 8.0 g. cyclohexane and added to a pressure vessel. The reaction was carried out by heating for 3 hours at 140° C. with agitation. A 50% conversion of ketone was obtained at a selectivity of 90% to δ-valerolactone.

EXAMPLE 6

Ethyl benzene hydroperoxide (4.6 g.), cyclohexanone (2.95 g.), benzene (26 g.) and boric anhydride (0.11 g.) were introduced into a glass reaction vessel of 120 ml., capacity provided with a Teflon-covered stirrer bar. The reaction vessel was connected via a Drallim "O" ring coupling to a 200 p.s.i. pressure gauge and relief valve.

The reactor was heated by immersion in an oil bath on a Gallenkamp stirrer-hotplate for 2 hours at 150° C. During the reaction the pressure in the system rose to 80 p.s.i.g.

A conversion of cyclohexanone to ε-caprolactone of 32% was obtained in the operation, the selectivity being 100% based on the amount of ketone consumed.

EXAMPLE 7

Ethyl benzene hydroperoxide (4.6 g.), cyclohexanone (2.95 g.), benzene (26 g.) and boric anhydride (0.011 g.) were reacted together in a vessel as described in Example 6 at 120° C. for a period of 6 hours. The pressure in the system rose to 26 p.s.i.g. in this time. A conversion of cyclohexanone to ε-caprolactone of 23% was obtained, the selectivity being 90% based on the amount of ketone consumed.

EXAMPLE 8

The reaction was carried out according to Example 6 except that the benzene was replaced by 25 g. of ethyl benzene. The conversion of cyclohexanone to ε-caprolactone was 26%, the selectivity being 93% based on the amount of ketone consumed.

EXAMPLE 9 t-Butyl hydroperoxide (3 g.), cyclohexanone (3 g.) and metaboric acid (0.012 g.) were diluted with benzene (24 g.) and introduced into a pressure vessel as described in Example 6. The reaction was carried out by heating on the stirrer-hotplate at 145° C. for 2 hours. A 27% conversion of cyclohexanone to ε-caprolactone was obtained, the selectivity being 92% based on the amount of ketone consumed.

EXAMPLE 10

In order to demonstrate the necessity for using the catalyst a run was carried out in the absence of metaboric acid, or anhydride or ester thereof. Thus 2.0 g. tertiary butyl hydroperoxide and 2.0 g. cyclohexanone were diluted with 18.0 g. benzene and added to a pressure tube. The reaction was carried out by heating at 170° C. for 4.5 hours with agitation. No ε-caprolactone was detected in the products by gas chromatography or nuclear magnetic resonance.

I claim:

1. A process for the production of cyclic esters which process comprises reacting a cyclic ketone containing from 5 to 12 carbon atoms and a hydroperoxide of the formula R—OOH wherein R is selected from the group consisting of alkyl, alkenyl, phenyl, alkyl phenyl and phenyl alkyl groups in the presence of a catalytic amount of a compound selected from the group consisting of metaboric acid, metaboric acid anhydride and a metaborate ester of the formula $(R^1-O-B=O)_n$ wherein $R^1$ is selected from the group consisting of alkyl, phenyl, alkyl phenyl and phenyl alkyl groups and $n$ is an integer which is 1 or 3 depending on the stereochemistry of the alkyl, phenyl, alkyl phenyl or phenyl alkyl group in an inert diluent under substantially anhydrous conditions.

2. A process according to claim 1 wherein the cyclic ketone is selected from the group consisting of cyclopentanone, cyclohexanone and cyclododecanone.

3. A process according to claim 1 wherein the hydroperoxide is selected from the group consisting of cumene hydroperoxide, cyclohexyl hydroperoxide, ethyl benzene hydroperoxide and tertiary butyl hydroperoxide.

4. A process according to claim 1 wherein $R^1$ is an alkyl group containing from 1 to 12 carbon atoms.

5. A process according to claim 1 wherein the compound selected from the group consisting of metaboric acid, metaboric acid anhydride and a metaborate ester is employed in an amount of from 0.1 to 20 mole percent of the amount of ketone employed.

6. A process according to claim 1 wherein the reaction temperature is between 120° and 200° C.

7. A process according to claim 1 wherein the amount of the compound selected from the group consisting of metaboric acid, metaboric acid anhydride and a metaborate ester is from 0.1 to 20 mole percent of the amount of cyclic ketone and wherein the reaction temperature is from 120° to 200° C.

References Cited

UNITED STATES PATENTS 3,728,359    4/1973    Mookherjee _____ 260—343

JOHN M. FORD, Primary Examiner

U.S. Cl. X.R.

260—343.5